US009182763B2

(12) United States Patent
Park et al.

(10) Patent No.: US 9,182,763 B2
(45) Date of Patent: Nov. 10, 2015

(54) APPARATUS AND METHOD FOR GENERATING THREE-DIMENSIONAL MAP USING STRUCTURED LIGHT

(75) Inventors: Dong-ryeol Park, Hwaseong-si (KR); Dong-jo Kim, Yongin-si (KR); Seok-won Bang, Seoul (KR); Hyoung-ki Lee, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1176 days.

(21) Appl. No.: 12/153,440

(22) Filed: May 19, 2008

(65) Prior Publication Data
US 2009/0125175 A1    May 14, 2009

(30) Foreign Application Priority Data
Nov. 9, 2007 (KR) .................. 10-2007-0114322

(51) Int. Cl.
*G06F 19/00* (2011.01)
*G05D 1/02* (2006.01)

(52) U.S. Cl.
CPC .............. *G05D 1/0274* (2013.01); *G05D 1/024* (2013.01); *G05D 1/027* (2013.01); *G05D 1/0272* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,933,864 A * | 6/1990 | Evans et al. | | 701/23 |
| 4,954,962 A | 9/1990 | Evans, Jr. et al. | | |
| 5,051,906 A * | 9/1991 | Evans et al. | | 701/28 |
| 6,009,359 A * | 12/1999 | El-Hakim et al. | | 701/28 |
| 6,459,955 B1 * | 10/2002 | Bartsch et al. | | 700/245 |
| 6,732,826 B2 | 5/2004 | Song et al. | | |
| 7,110,100 B2 * | 9/2006 | Buermann et al. | | 356/138 |
| 7,456,596 B2 * | 11/2008 | Goodall et al. | | 318/568.12 |
| 7,587,260 B2 * | 9/2009 | Bruemmer et al. | | 700/253 |
| 7,693,654 B1 * | 4/2010 | Dietsch et al. | | 701/461 |
| 7,706,917 B1 * | 4/2010 | Chiappetta et al. | | 700/245 |
| 7,720,554 B2 * | 5/2010 | DiBernardo et al. | | 700/56 |
| 7,720,572 B2 * | 5/2010 | Ziegler et al. | | 700/245 |

(Continued)

FOREIGN PATENT DOCUMENTS

| | | |
|---|---|---|
| CN | 1381340 A | 11/2002 |
| CN | 101008571 | 8/2007 |

(Continued)

OTHER PUBLICATIONS

Young-Youp Chan, "The Development of a Mobile Robot Equipped with a Structured Light Range Sensor", International Journal of Intelligent Automation and Soft Computing, Oct. 13, 1997.

(Continued)

*Primary Examiner* — Jonathan L Sample
(74) *Attorney, Agent, or Firm* — Harness, Dickey & Pierce, P.L.C.

(57) ABSTRACT

A three-dimensional map-generating apparatus and method using structured light. The apparatus for generating a three-dimensional map using structured light includes an odometer detecting the pose of a mobile robot, and a distance-measuring sensor including a light source module that emits light upward and a camera module that captures an image formed by light reflected from an obstacle, and measuring a distance to the obstacle using the captured image. The apparatus measures a distance to the obstacle using the distance-measuring sensor while changing the relative pose of the mobile robot, thereby generating a three-dimensional map.

20 Claims, 14 Drawing Sheets

(56) References Cited

U.S. PATENT DOCUMENTS

| | | | |
|---|---|---|---|
| 7,765,027 B2* | 7/2010 | Hong et al. | 700/245 |
| 7,845,560 B2* | 12/2010 | Emanuel et al. | 235/462.08 |
| 7,912,583 B2 | 3/2011 | Gutmann et al. | |
| 7,957,837 B2* | 6/2011 | Ziegler et al. | 700/258 |
| 8,831,872 B2* | 9/2014 | Hong et al. | 701/409 |
| 2002/0156556 A1* | 10/2002 | Ruffner | 701/23 |
| 2003/0176986 A1* | 9/2003 | Dietsch et al. | 702/150 |
| 2004/0156541 A1* | 8/2004 | Jeon et al. | 382/153 |
| 2004/0158357 A1* | 8/2004 | Lee et al. | 700/258 |
| 2005/0183275 A1* | 8/2005 | Kwon et al. | 33/361 |
| 2005/0288079 A1* | 12/2005 | Tani | 463/1 |
| 2006/0025888 A1* | 2/2006 | Gutmann et al. | 700/245 |
| 2006/0165276 A1* | 7/2006 | Hong et al. | 382/153 |
| 2006/0184013 A1* | 8/2006 | Emanuel et al. | 600/426 |
| 2006/0221072 A1* | 10/2006 | Se et al. | 345/420 |
| 2007/0150097 A1* | 6/2007 | Chae et al. | 700/245 |
| 2007/0156286 A1* | 7/2007 | Yamauchi | 700/245 |
| 2007/0192910 A1* | 8/2007 | Vu et al. | 901/17 |
| 2007/0198128 A1* | 8/2007 | Ziegler et al. | 700/245 |
| 2007/0216797 A1* | 9/2007 | Yoshida et al. | 348/370 |
| 2008/0012310 A1* | 1/2008 | Weaver et al. | 285/288.1 |
| 2008/0027591 A1* | 1/2008 | Lenser et al. | 701/2 |
| 2008/0119961 A1* | 5/2008 | Myeong et al. | 700/262 |
| 2008/0262718 A1* | 10/2008 | Farwell | 701/207 |
| 2009/0024251 A1* | 1/2009 | Myeong et al. | 700/259 |
| 2009/0125175 A1* | 5/2009 | Park et al. | 701/28 |

FOREIGN PATENT DOCUMENTS

| | | |
|---|---|---|
| EP | 0358628 | 3/1990 |
| JP | 2002-090113 | 3/2002 |
| JP | 2004-188562 | 7/2004 |
| JP | 2005310043 A | 11/2005 |
| JP | 2006-119090 | 5/2006 |
| KR | 10-2002-008135 | 10/2002 |
| KR | 10-0757751 | 9/2007 |
| KR | 10-0776215 B1 | 11/2007 |
| WO | 2007/051972 | 5/2007 |

OTHER PUBLICATIONS

Chinese Office Action dated Mar. 12, 2012 from Chinese Patent Application No. 200810174123.1.

Chinese Office Action from Chinese Patent Application No. 200810174123.1 dated Aug. 31, 2012.

Masahiro Tomono, "Environment Modeling by a Mobile Robot with a Laser Range Finder and a Monocular Camera", 2005 IEEE Workshop on Advanced Robotics and Its Social Impacts, Jun. 2005, pp. 133-138.

Extended European Search Report issued Nov. 21, 2012 in European Patent Application No. 08168372.4.

Korean Notice of Allowance for Korean patent application No. Oct. 2007-0114322 dated Oct. 30, 2014.

\* cited by examiner (a) THREE-DIMENSIONAL MAP AS VIEWED FROM OUTSIDE OF CEILING TOWARD CEILING (b) THREE-DIMENSIONAL MAP AS VIEWED FROM SIDE WALL

APPARATUS AND METHOD FOR GENERATING THREE-DIMENSIONAL MAP USING STRUCTURED LIGHT

CROSS-REFERENCE TO RELATED APPLICATIONS

This application claims priority from Korean Patent Application No. 10-2007-0114322 filed on Nov. 9, 2007 in the Korean Intellectual Property Office, the disclosure of which is incorporated herein by reference in its entirety.

BACKGROUND

1. Field

One or more embodiments of the present invention relate to an apparatus and method for generating a three-dimensional map, and, more particularly, to an apparatus and method for generating a three-dimensional map using structured light that is emitted upward to a ceiling.

2. Description of the Related Art

In general, robots have been developed to improve factory automation. In recent years, robots available for home and office use as well as industrial robots have been put to practical use. Examples of the robots available for home and office use include cleaning robots, guide robots, and security robots.

In mobile robots, such as cleaning robots, it is generally indispensable to create a map that is recognized by the robots in order to designate a traveling path of the robot or a working area of the robot. In order to create the map, various methods, such as methods of using a vision sensor, an ultrasonic sensor, and a touch sensor, have been used to control the robot to create a map while being autonomously navigated. However, a method of using structured light and a camera is very effective since it needs a small amount of computation and can be used in a place where there is a large variation in brightness.

In this method, as shown in FIG. 1, an active light source 10, such as a laser, is used to emit a predetermined laser beam to an obstacle 30, and a sensor 20, such as a camera, captures an image formed by the laser beam reflected from the obstacle. Then, it is possible to calculate the distance between the laser emission point and the obstacle 30, which is a reflection point, by using a triangular method, on the basis of coordinates of the image captured by the camera 20, the radiation angle of light, and the distance between the camera 20 and the laser emission point.

In the related art, since light is emitted in the forward direction in which the mobile robot moves, the mobile robot can generate only a two-dimensional map due to limited information.

In FIG. 1, a distance d between the light source 10 and the camera sensor 20 is referred to as a baseline. The longer the distance becomes, the higher the range resolution becomes. When robots having a limited height, such as cleaning robots, emit light forward, in many cases, the baseline is short. In this case, the range resolution at a long distance is lowered, which makes it difficult to generate a map.

SUMMARY

An aspect of the present invention is to provide an apparatus and method for generating a three-dimensional map by radiating structured light upward and accumulating pose information of a mobile robot and distance data obtained at each pose.

Additional aspects and/or advantages will be set forth in part in the description which follows and, in part, will be apparent from the description, or may be learned by practice of the invention.

According to an aspect of the present invention, there is provided a three-dimensional map-generating apparatus. The apparatus includes an odometer detecting a pose of a mobile robot, a distance-measuring sensor, including a light source module to emit light upward, relative to a movement direction of the mobile robot, and a camera module to capture an image formed by the light as reflected from an obstacle, measuring a distance to the obstacle for the mobile robot using the captured image, and a map-generating unit generating a three-dimensional map using the distance measured by the distance-measuring sensor while changing the pose of the mobile robot.

According to another aspect of the present invention, there is provided a three-dimensional map-generating method. The method includes detecting a pose of a mobile robot, measuring a distance to an obstacle for the mobile robot using a distance-measuring sensor that includes a light source module emitting light upward, relative to a movement direction of the mobile robot, and a camera module capturing an image formed by the light as reflected from the obstacle, and measuring the distance to the obstacle using the captured image, and generating a three-dimensional map by measuring the distance while changing the pose of the mobile robot.

BRIEF DESCRIPTION OF THE DRAWINGS

The above and other features and advantages of the present invention will become apparent by describing in detail preferred embodiments thereof with reference to the attached drawings in which.

DETAILED DESCRIPTION OF THE EMBODIMENTS

Figure 1:
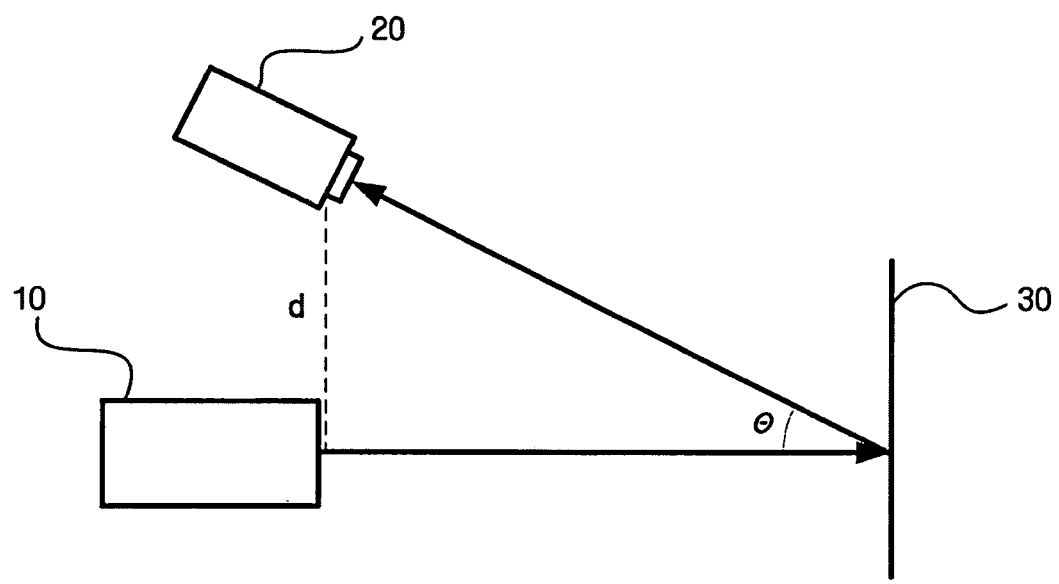
FIG. 1 is a diagram illustrating an apparatus for measuring a distance using structured light.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Exemplary embodiments of the present invention will hereinafter be described with reference to block diagrams or flowcharts. It will be understood that each block of the flowchart illustrations, and combinations of blocks in the flowchart illustrations, can be implemented by computer readable code/instructions. This computer readable code can be provided to a processor of a general purpose computer, special purpose computer, or other programmable data processing apparatus to produce a machine, such that the instructions, which execute via the processor of the computer or other programmable data processing apparatus, create elements for implementing the operations specified in the flowchart block or blocks, for example.

Thus, embodiments of the present invention may be implemented through such computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or controlling carrier waves as well as elements of the Internet, for example. Thus, the medium may be such a defined and measurable structure carrying or controlling a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Below, first will be discussed a principle of measuring a distance using structured light according to an embodiment of the invention.

Figure 2:
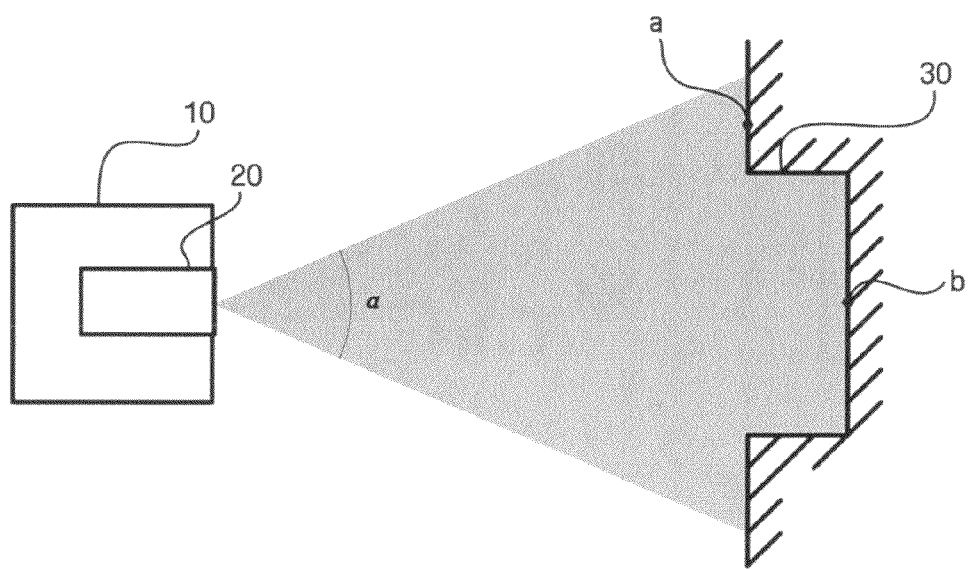
FIG. 2 is a diagram illustrating the emission of light to an obstacle in order to capture a structured light image.
Figure 3:
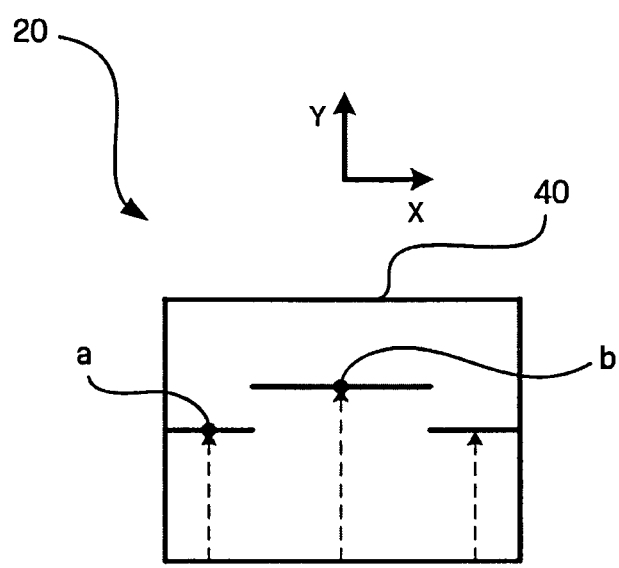
FIG. 3 is a diagram illustrating a camera image captured by a camera sensor shown in FIG. 2.

FIG. 1 is a side view illustrating a distance measuring apparatus using structured light, FIG. 2 is a diagram illustrating light emitted to an obstacle in order to obtain a structured light image, FIG. 3 is a diagram illustrating an image captured by the camera sensor shown in FIG. 2. Herein, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could be a single processing element or implemented through a distributed network, noting that additional and alternative embodiments are equally available.

An active light source 10, such as a laser, is used to emit light to an obstacle 30, and a camera sensor 20 acquires image information reflected from the obstacle 30. In this case, the camera sensor 20 is positioned above the light source 10 at a constant distance d from the light source 10, and acquires the image information. The light source 10 may be a near infrared line laser. The near infrared laser beam makes it possible to acquire image information in a dark place in which there is no light.

Referring to FIG. 2, the light source 10 emits laser beams to the obstacle 30 at a constant viewing angel a in a plan view. FIG. 3 shows a camera image 40 in the form of a line profile that is captured by the camera module 20. Light components reflected from points a and b of the obstacle 30 shown in FIG. 2 are represented as points a and b of the camera image 40 shown in FIG. 3, and values in a Y-axis direction are proportional to the distance between the camera sensor 20 and the obstacle 30.

Distance data between the light source 10 and the obstacle 30 is calculated by a triangular method on the basis of the distance between the camera module 20 and the obstacle 30 obtained from coordinates on the camera image 40, the angle θ of the camera sensor 20 with respect to the obstacle 30, and a distance d between the camera module 20 and the light source 10. Since the triangular method has been known, a detailed description thereof will be omitted.

Next, a three-dimensional map-generating apparatus using structured light according to an embodiment of the invention will be described.

Figure 4:
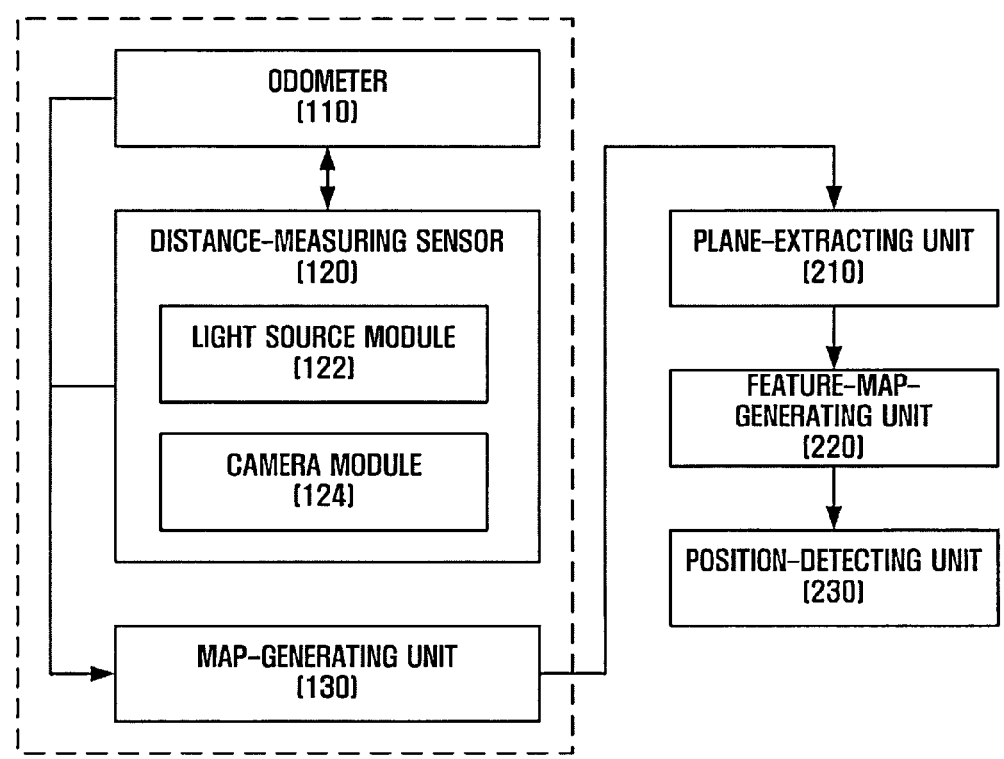
FIG. 4 is a block diagram illustrating a three-dimensional map-generating apparatus using structured light, according to an embodiment of the invention.
Figure 5:
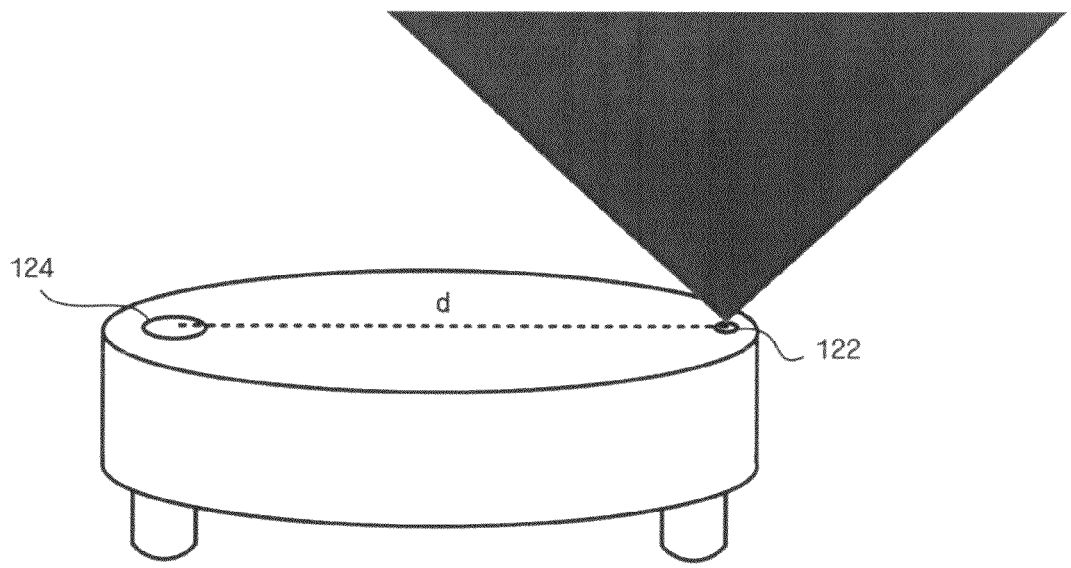
FIG. 5 is a diagram illustrating the structure of a distance-measuring sensor of the three-dimensional map-generating apparatus using structured light, according to an embodiment of the invention.
Figure 6:
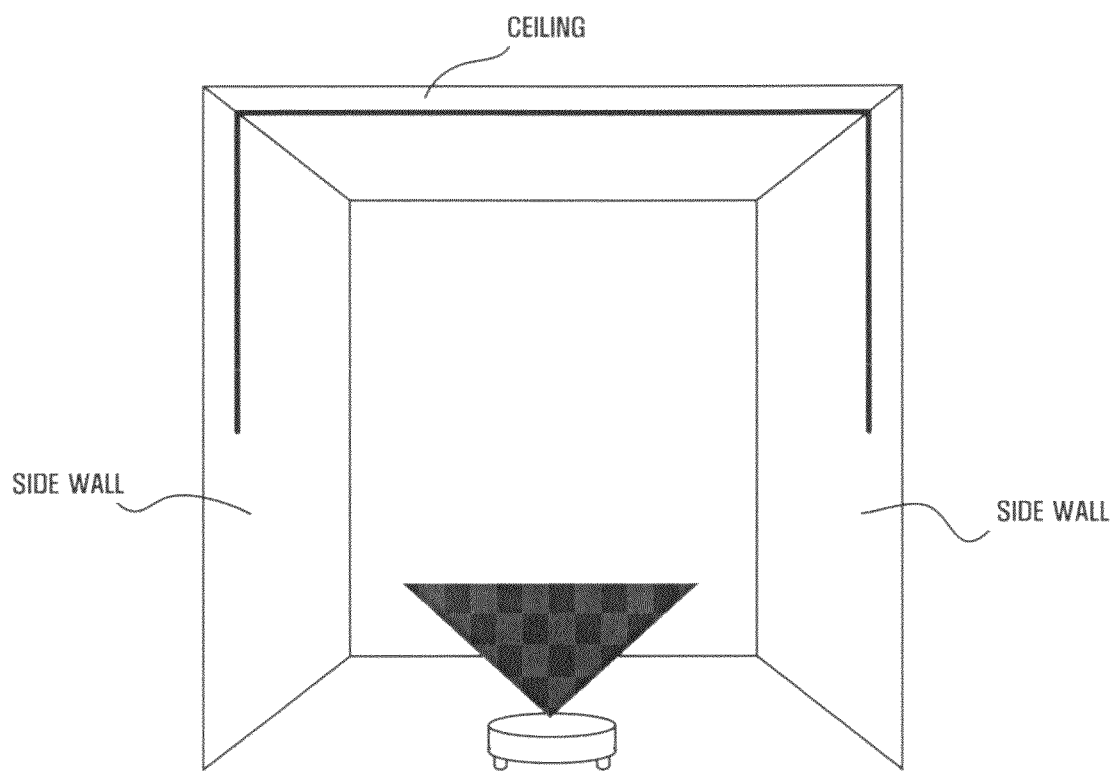
FIG. 6 is a diagram illustrating a process of radiating a laser beam onto the ceiling and wall to obtain distance data using the three-dimensional map-generating apparatus using structured light, according to an embodiment of the invention.

FIG. 4 is a block diagram illustrating the three-dimensional map-generating apparatus using structured light according to the embodiment of the invention. FIG. 5 is a diagram illustrating the structure of a distance-measuring sensor of the three-dimensional map-generating apparatus using structured light according to the embodiment of the invention. FIG. 6 is a diagram illustrating the measurement of distance data by radiating a laser beam on the ceiling and wall using the three-dimensional map-generating apparatus using structured light according to the embodiment of the invention.

The three-dimensional map-generating apparatus using structured light according to the embodiment of the invention may include an odometer 110 and a distance-measuring sensor 120 having a light source module 122 and a camera module 124. The three-dimensional map-generating apparatus may further include a plane-extracting unit 210, a feature-map-generating unit 220, and a position-detecting unit 230.

The odometer 110 is provided in a mobile robot to detect the relative pose of the mobile robot. The term "pose" means the position and direction angle of the mobile robot. When the mobile robot moves from pose A to pose B, the odometer 110 can detect a variation in the pose of the mobile robot with respect to pose A. For example, an encoder or a gyrosensor may be used as the odometer 110. The encoder integrates the distance and direction of the mobile robot in order to know the current pose of the mobile robot.

The distance-measuring sensor 120 includes a light source module 122 that emits light and a camera module 124 that captures the image of an obstacle using light reflected therefrom, and measures the distance from the obstacle. In the present embodiment, a line laser is used as the light source. When the line laser emits light at a predetermined angle in the horizontal direction, the camera module captures an image formed by light reflected from the obstacle within the emission range of light, thereby obtaining distance data. As described above, the distance data may be calculated by the triangular method.

As shown in FIG. 5, the distance-measuring sensor 120 according to the embodiment of the invention is provided at an upper part of the mobile robot, emits light to the ceiling, that is, in the upward direction, and measures the distance from an obstacle on the ceiling.

In particular, a cleaning robot is preferably designed to be thin. However, as described above, in the related art, when a mobile robot emits light forward, a base line is shortened, and resolution at a long distance is lowered, which results in difficulties in generating a map. However, in the present embodiment, as shown in FIG. 5, the light source module 122 and the camera module 124 are provided at an upper part of the mobile robot to lengthen a base line d, which makes it possible to solve the problem of the resolution being lowered.

In addition, in the present embodiment, since a laser beam is used, it is possible to perform the generation of a map and localization in dark environments.

FIG. 6 shows a process of obtaining distance data by radiating laser beams upward in the actual environment in which there is a ceiling and walls. As shown in FIG. 6, it is possible to obtain distance data between the mobile robot and the ceiling or the wall within the radiation range of the laser beam. As the laser beam is radiated at a larger angle, the distance data can be obtained in a wider range. Alternatively, two pairs of the light source module and the camera module having a predetermined angle range may be provided to obtain distance data in the entire range on the upper surface of the mobile robot, that is, at an angle of 180° on the upper surface of the mobile robot.

The three-dimensional map-generating apparatus using structured light according to the embodiment of the invention generates a three-dimensional map using pose information and distance data information that are respectively obtained from the odometer 110 and the distance-measuring sensor 120 while changing the pose of the mobile robot.

Next, the principle of generating a three-dimensional map using pose information and distance data information will be described with reference to FIGS. 7 and 8.

Figure 7:
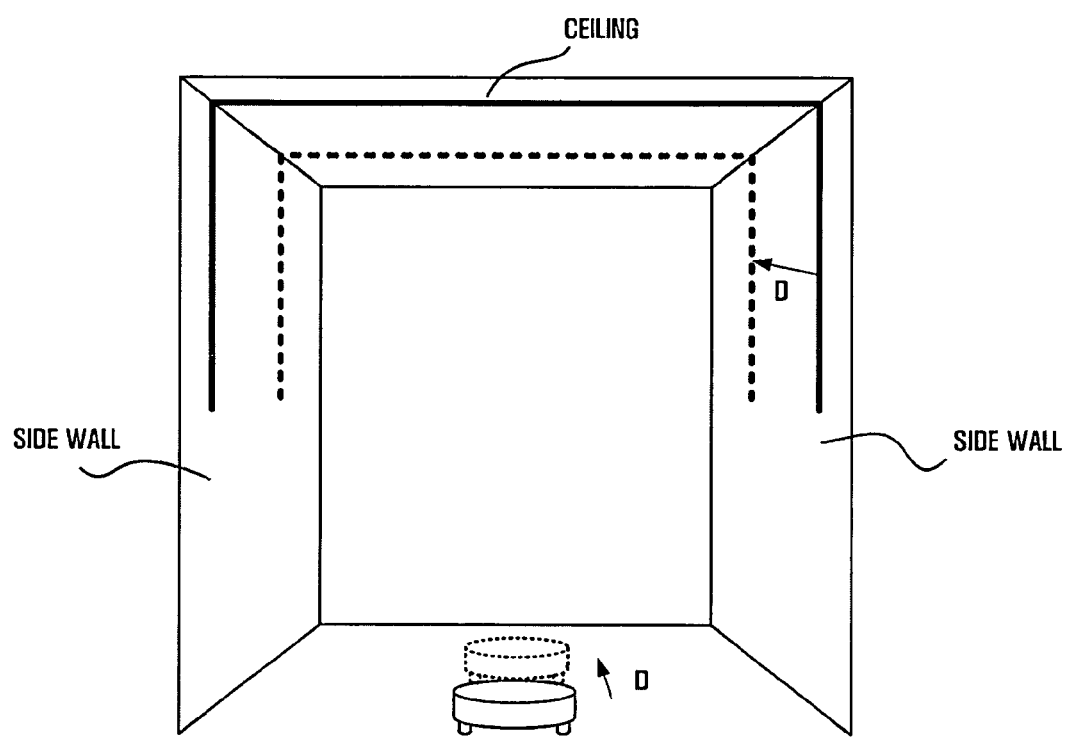
FIGS. 7 and 8 are diagrams illustrating a process of obtaining the distance data for generating a three-dimensional map while moving and rotating the three-dimensional map-generating apparatus using structured light, according to an embodiment of the invention to change the pose thereof.
Figure 8:
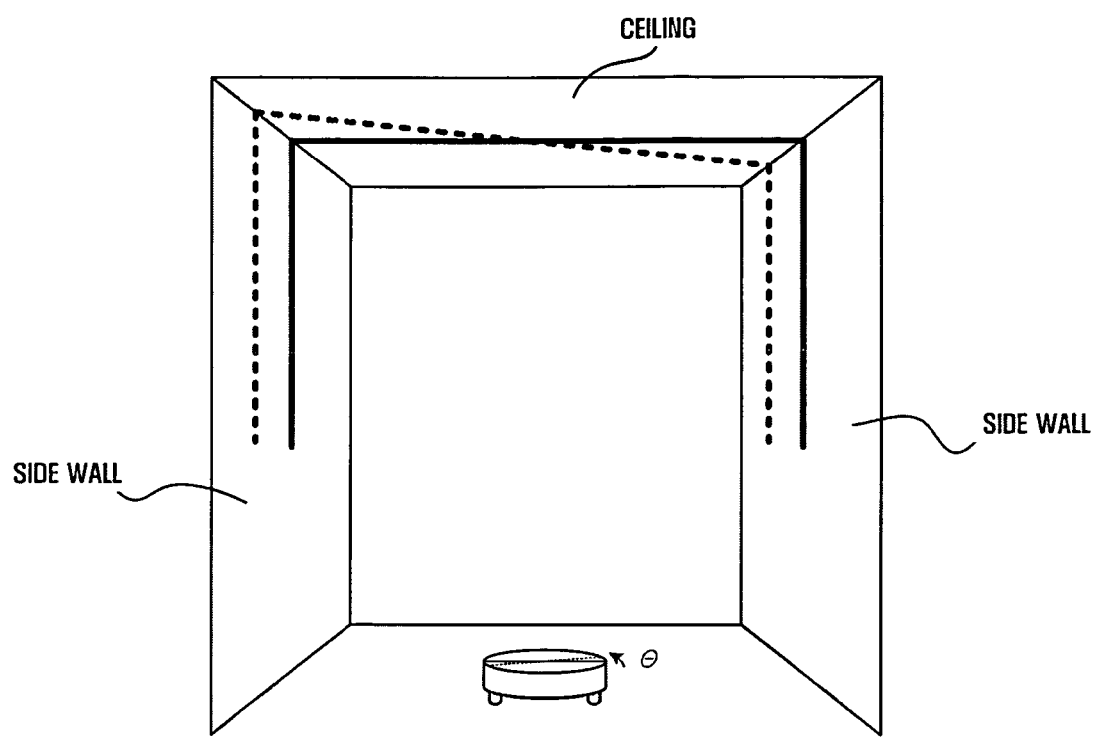

FIGS. 7 and 8 are diagrams illustrating a process of obtaining distance data for generating a three-dimensional map by moving and rotating the three-dimensional map-generating apparatus using structured light according to the embodiment of the invention to change the pose thereof.

FIG. 7 is a diagram illustrating the operation of the mobile robot measuring the distance using the distance-measuring sensor 120 while moving in a straight line. When the mobile robot is disposed at a position corresponding to a solid line, the solid line drawn on the ceiling and the wall indicates distance information acquired by the line laser. Then, the pose of the mobile robot is changed to measure the distance. That is, in FIG. 7, the position of the mobile robot is changed to measure the distance. In FIG. 7, assuming that the mobile robot moves in parallel to both walls to a position corresponding to a dotted line to measure the distance, the distance data obtained by the distance-measuring sensor 120 at the position corresponding to the solid line is identical with the distance data obtained by the distance-measuring sensor 120 at the position corresponding to the dotted line. That is, only two-dimensional distance data is obtained at the positions corresponding to the solid line and the dotted line. However, it is possible to obtain three-dimensional distance data by acquiring from the odometer 110 information indicating that the mobile robot is moved in a straight line from the position corresponding to the solid line by a distance of d, and reflecting the acquired information to the distance data obtained at the position corresponding to the dotted line.

FIG. 8 is a diagram illustrating the operation of the mobile robot measuring the distance using the distance-measuring sensor 120 while rotating at a fixed position in the counterclockwise direction.

When the mobile robot is disposed at a position corresponding to a solid line, the solid line drawn on the ceiling and the side walls indicates distance information acquired by the line laser, similar to FIG. 7. Then, the pose of the mobile robot is changed to measure the distance. That is, in FIG. 8, the mobile robot is rotated at a fixed position in the counterclockwise direction to measure the distance. As described above, distance data obtained by the distance-measuring sensor 120 at the positions is two-dimensional data. However, it is possible to obtain three-dimensional distance data by acquiring from the odometer 110 information indicating that the mobile robot is rotated in the counterclockwise direction from the position corresponding to the solid line by an angle of Θ and reflecting the acquired information to the distance data obtained at the position corresponding to the dotted line.

That is, as described above, it is possible to obtain three-dimensional distance data at the current pose by reflecting relative pose information obtained from the odometer 110 to two-dimensional distance data obtained from the distance-measuring sensor 120. In addition, it is possible to generate a three-dimensional map by accumulating three-dimensional distance data obtained by changing the pose of the mobile robot.

Figure 9A:
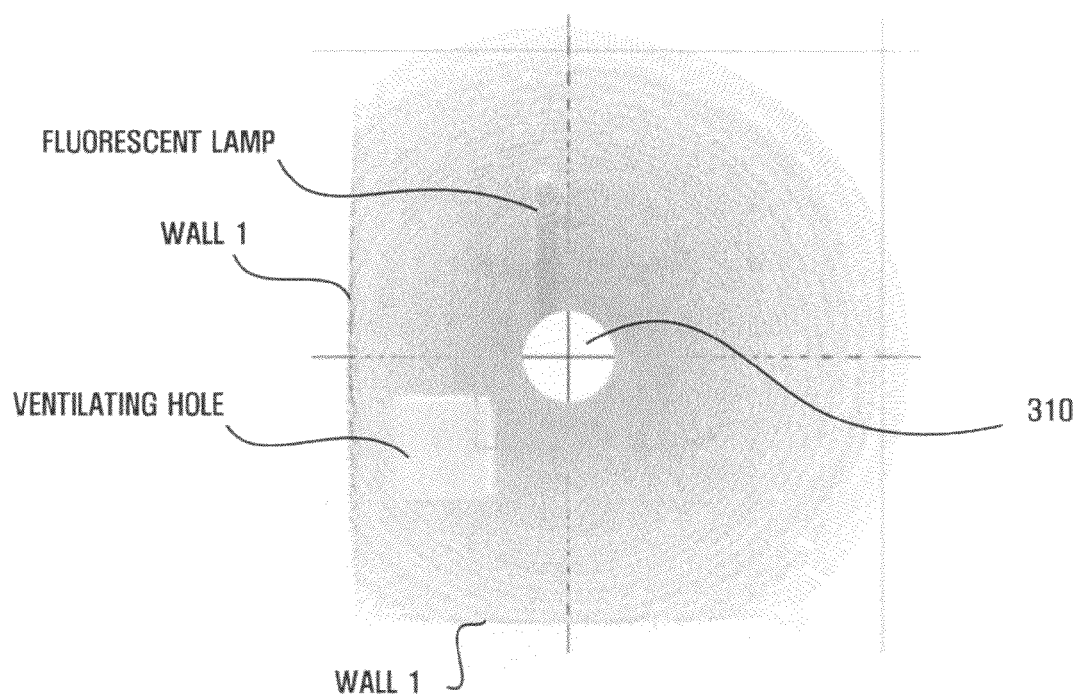
FIGS. 9A and 9B are diagrams illustrating three-dimensional maps obtained by the three-dimensional map-generating apparatus using structured light according to the embodiment of the invention, as viewed from the ceiling and the wall, respectively.
Figure 9B:
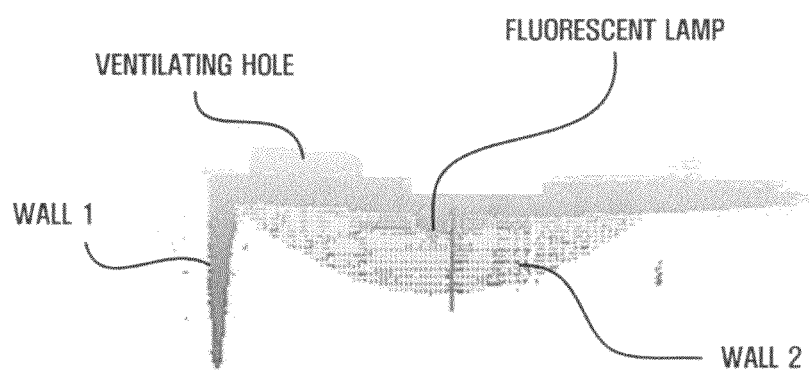

FIGS. 9A and 9B are diagrams illustrating three-dimensional maps obtained by the three-dimensional map-generating apparatus using structured light according to the present embodiment of the invention, as viewed from the ceiling and the wall, respectively.

FIGS. 9A and 9B show the three-dimensional maps that are generated on the basis of the distance data obtained by the rotation of the mobile robot at a fixed position. In FIG. 9A, a hollow 310 without distance information is formed at the center of the map, and the mobile robot is positioned at the center of the hollow 310. The hollow 310 without distance information is formed within a predetermined distance range from the position of the mobile robot since the light source module 122 is provided at the edge of the mobile robot, not the center, as shown in FIG. 5.

As shown in FIGS. 9A and 9B, it is possible to generate a three-dimensional map by accumulating the three-dimensional distance data. It is possible to find edges between the ceiling and the wall and an apex of the ceiling formed by intersection of two edges from the three-dimensional map, and it is also possible to acquire information on the ceiling, a ventilating hole formed in the ceiling, and a fluorescent lamp provided on the ceiling from the three-dimensional map.

The plane-extracting unit 210 extracts a plane from the three-dimensional map. As shown in FIGS. 9A and 9B, it is possible to extract edges between the ceiling and the wall and an apex formed by intersection between two edges, and thus the plane-extracting unit 210 can extract a plane, such as the ceiling, from the extracted edges and apexes.

The feature-map-generating unit 220 extracts feature points, such as apexes, from the extracted plane, and generates a feature map on the basis of the feature points.

The position-detecting unit 230 compares the feature points extracted from the map at the current position with feature points of the feature map stored beforehand to detect the position of the mobile robot. A process of detecting the position of the mobile robot will be described below with reference to FIG. 11.

Figure 10:
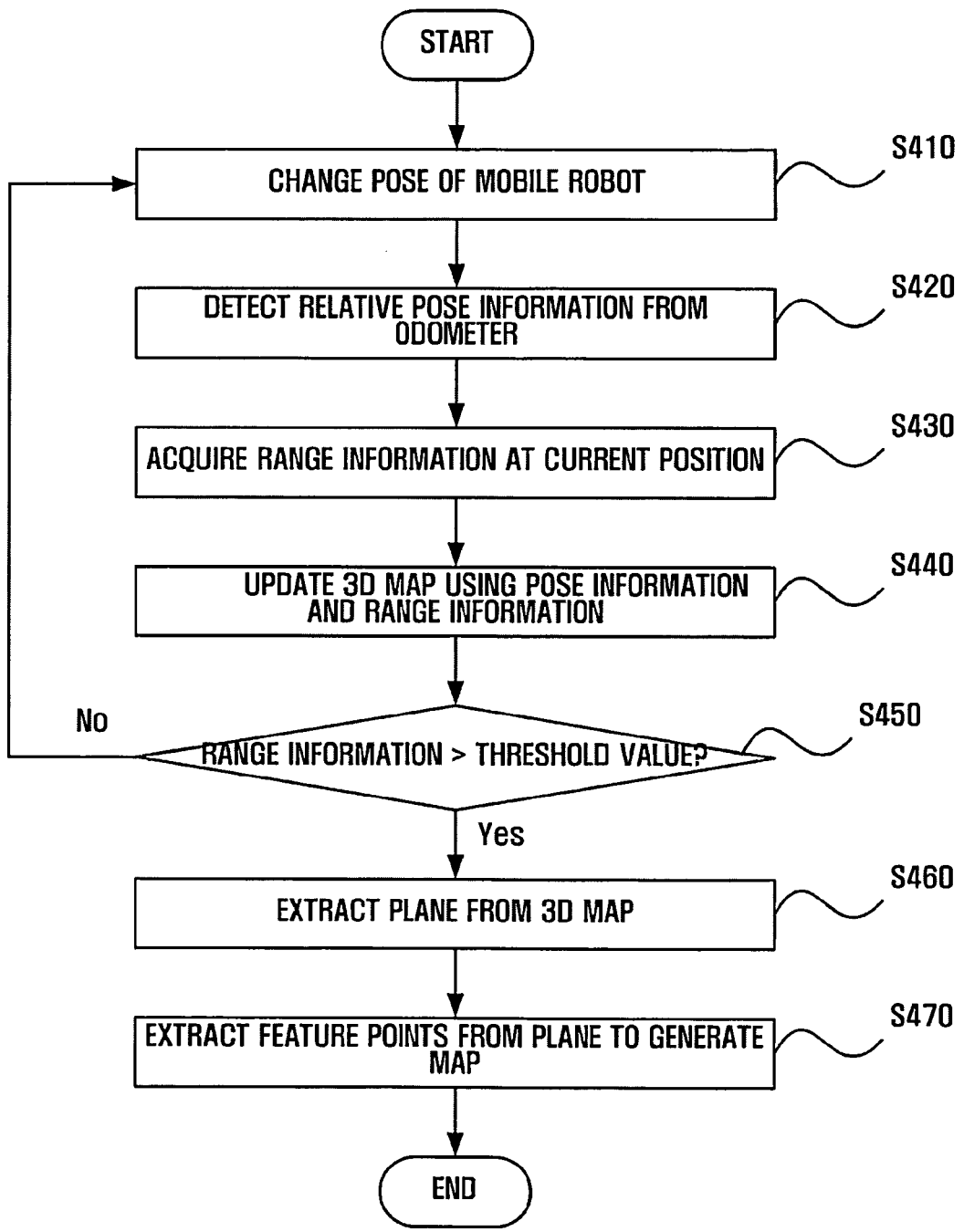
FIG. 10 is a flowchart illustrating a method of generating a three-dimensional map using structured light, according to an embodiment of the invention.

FIG. 10 is a flowchart illustrating a method of generating a three-dimensional map using structured light according to an embodiment of the invention.

First, the pose of the mobile robot is changed (S410). Then, the odometer 110 detects relative pose information (S420). The term "relative pose information" means a variation in the position and direction angle of the mobile robot between the previous pose and the current pose.

Then, a line laser is used to acquire range information at the current position (S430). The term "range information" means distance data that is obtained by radiating a laser beam from the line laser within a predetermined angle range. The pose information is reflected to the acquired range information to generate three-dimensional distance data (S440), thereby updating the three-dimensional map. In this case, these processes are repeated until the number of range information items is larger than a threshold value (S450) to update the three-dimensional map. The threshold value may be a predetermined number of times the pose of the mobile robot is changed, or an arbitrary number required to acquire specific information. The arbitrary number required to acquire specific information may be the number of range information items required to measure the overall area of the ceiling. That is, these processes are repeated until information on the overall area of the ceiling is acquired. When the information on the overall area of the ceiling is acquired, the generation of the three-dimensional map may end.

After generating the three-dimensional map, the plane-extracting unit 210 may extract a plane from the three-dimensional map (S460). As shown in FIGS. 9A and 9B, it is possible to extract edges between the ceiling and the wall and an apex formed by intersection between two edges, and thus the plane-extracting unit 210 can extract a plane, such as the ceiling, from the extracted edges and apexes.

Then, the feature-map-generating unit 220 may extract feature points from the extracted plane and generate a feature map (S470). The generated feature map may be used to detect the position of the mobile robot, which will be described below.

It is possible to detect the current position of the mobile robot using the three-dimensional map generated according to an embodiment of the invention.

Figure 11:
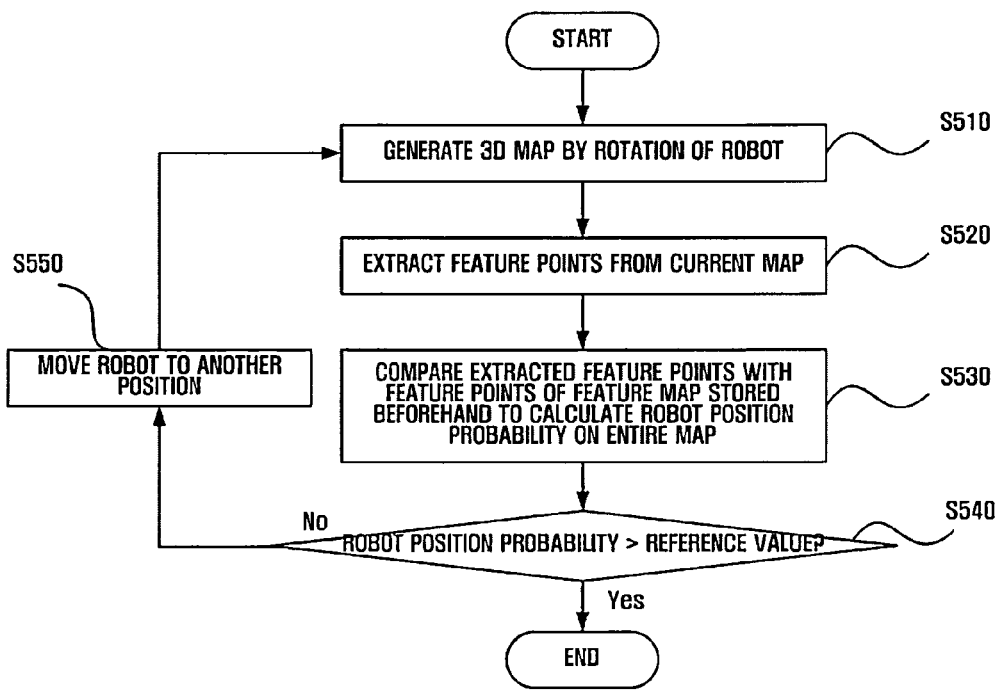
FIG. 11 is a flowchart illustrating a process of detecting the position of the mobile robot using the three-dimensional map generated, according to an embodiment of the invention.

FIG. 11 is a flowchart illustrating a process of detecting the position of a mobile robot using the three-dimensional map generated according to an embodiment of the invention.

First, a three-dimensional map is generated at the current position of the mobile robot while the mobile robot is rotated (S510). The generation of the three-dimensional map by the rotation of the mobile robot at the fixed position has been described with reference to FIGS. 9A and 9B. Then, feature points, such as apexes, are extracted from the three-dimensional map generated at the current position (S520). The extracted feature points are compared with the feature points of the map stored beforehand to calculate a robot position probability on the entire map (S530). When the three-dimensional map is generated, regions may be divided due to, for example, the limit of the radiation angle of the line laser and the wall. In this case, when the three-dimensional map is generated by the rotation of the mobile robot at the fixed position as shown in FIG. 9, it is difficult to generate a three-dimensional map including the entire region of the ceiling or all the regions of the map, but a three-dimensional map for only a local area is formed. Therefore, the three-dimensional map generated at the current position may be a portion of the entire three-dimensional map. The feature points extracted from the three-dimensional map generated at the current position may also be some of all the feature points forming the entire feature map. Therefore, it is possible to calculate the robot position probability on the entire map by comparing the distribution of the feature points that are extracted from the three-dimensional map generated at the current position with the distribution of the feature points forming the entire feature map. For example, a Monte Carlo method may be used to calculate the robot position probability. The Monte Carlo method is used to calculate the probability distribution of a desired numerical value from repeated statistical sampling experiments, and a detailed description thereof will be omitted. When the calculated robot position probability is smaller than a predetermined reference value, the detection of the robot fails, and the robot is disposed at another position (S550). The above-mentioned processes are repeated to detect the position of the mobile robot again. In contrast, when the robot position probability is larger than the predetermined reference value, the position having the probability value may be determined as the current position of the mobile robot.

As an application of the three-dimensional map-generating apparatus and method according to the embodiments of the invention, the mobile robot may travel in parallel to the wall.

Figure 12:
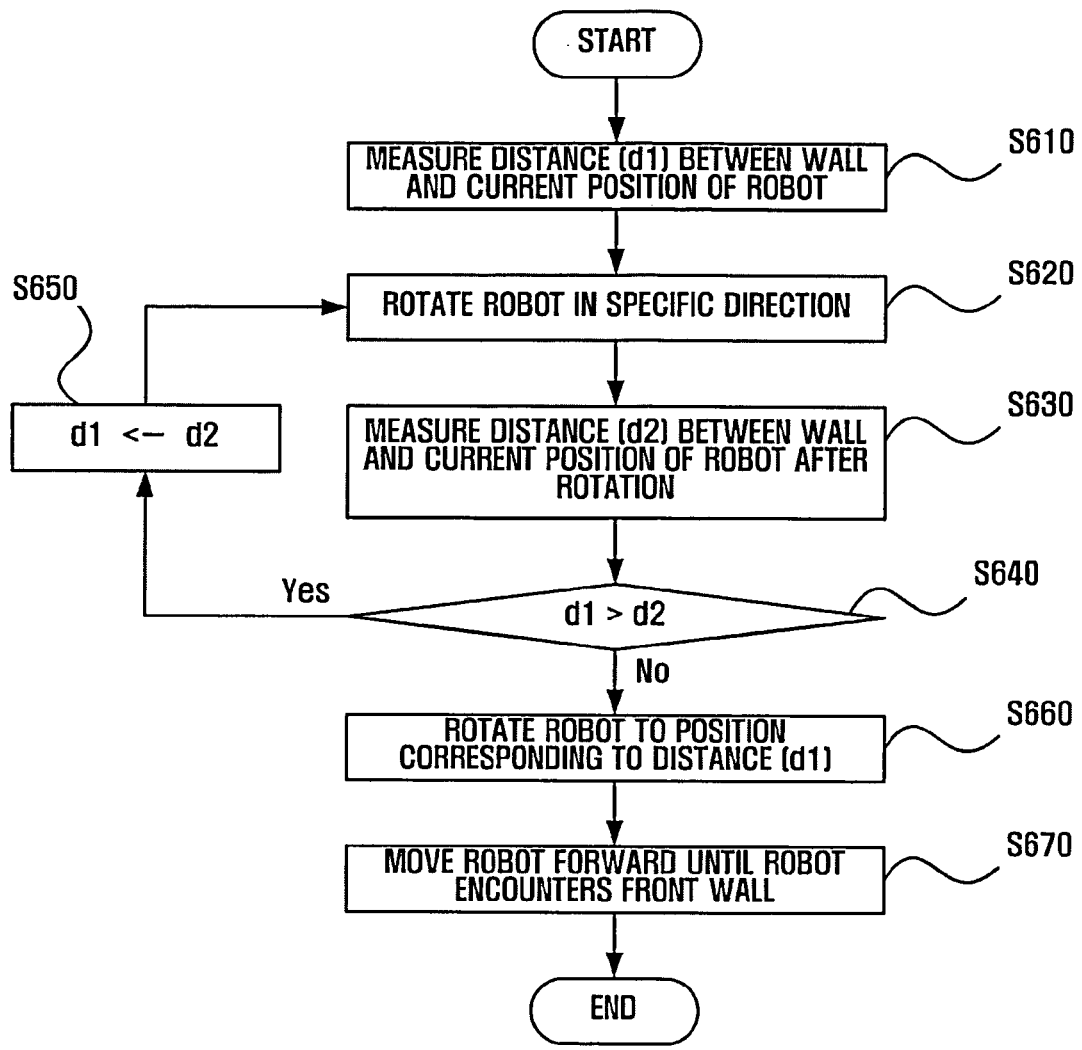
FIG. 12 is a flowchart illustrating a method of moving the mobile robot in parallel to the wall.
Figure 13:
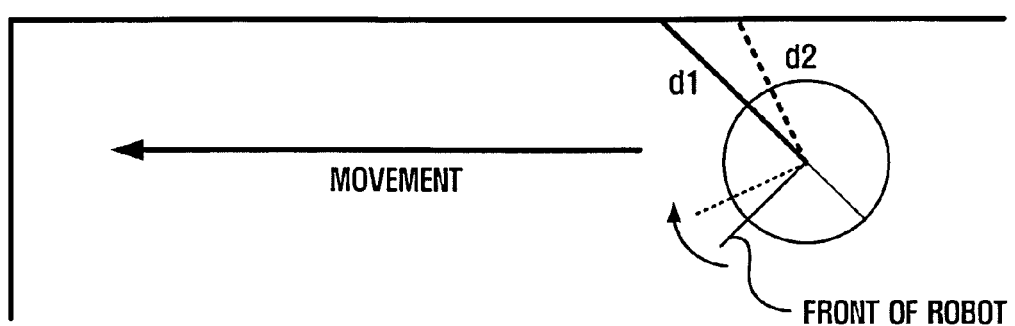
FIG. 13 is a diagram illustrating a process of positioning the mobile robot in parallel to the wall.

FIG. 12 is a flowchart illustrating a method of moving the mobile robot in parallel to the wall, and FIG. 13 is a diagram illustrating a process of positioning the mobile robot in parallel to the wall.

The mobile robot radiates a laser beam at the current position to measure a distance d1 to the wall (S610). The distance to the wall means the shortest distance between the surface of the mobile robot from which the laser beam is emitted and the wall, not the shortest distance between the mobile robot and the wall. When the distance to the wall is known at a specific radiation angle, it is possible to calculate the shortest distance between the mobile robot and the wall in the horizontal direction by using the triangular method using the angle and the distance. As shown in FIG. 13, when the laser beam is radiated upward in a direction vertical to the front of the mobile robot, the distance between the mobile robot and the wall is d1.

Then, the mobile robot is rotated in a specific direction (S620). As can be seen from FIG. 13, the mobile robot is rotated in the clockwise direction. After the rotation in the clockwise direction, the distance between the front of the mobile robot and the wall is represented by a dotted line.

The mobile robot is rotated by a predetermined angle in the clockwise direction as shown in FIG. 13, and then a distance d2 between the mobile robot and the wall is measured by the above-mentioned method (S630).

Then, the distance d1 is compared with the distance d2 (640). When the distance d2 is smaller than the distance d1, the distance between the mobile robot and the wall decreases due to the rotation of the mobile robot, which means that the mobile robot is parallel to the wall with the rotation of the mobile robot. This is because the distance between the mobile robot and the wall is the smallest when the mobile robot is parallel to the wall. Therefore, when d1>d2 is satisfied, d2 is set to d1 (S650), and the mobile robot is rotated in the same direction as described above by a predetermined angle (S620). After the rotation, the distance d2 between the mobile robot and the wall is measured, and the distance d2 is compared with the distance d1. When the distance d2 is larger than the distance d1, the mobile robot is rotated from a position that is parallel to the wall to a position that is not parallel to the wall. Therefore, the mobile robot is rotated to a position corresponding to the distance d1 (S660). In this case, it is assumed that the mobile robot is disposed at a position parallel to the wall. The mobile robot is disposed in parallel to the wall and then moves forward to encounter the front wall (S670), thereby moving the mobile robot in parallel to the wall.

In particular, the cleaning efficiency of a cleaning robot greatly depends on the traveling path of the robot. Therefore, as described above, when the cleaning robot is moved in parallel to the wall, it is possible to improve the cleaning efficiency of the cleaning robot, as compared to the existing random method.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A three-dimensional map-generating apparatus, comprising:
    an odometer to detect a pose of a mobile robot;
    a distance-measuring sensor, including a light source module disposed on an upper surface of the mobile robot to emit light upward relative to a movement direction of the mobile robot and a camera module, disposed on the upper surface of the mobile robot, to capture an image formed by the light as reflected downward from an obstacle that is upward of the camera module, to measure a distance to the obstacle for the mobile robot using the captured image; and
    a map-generating unit generating a three-dimensional map using the distance measured by the distance-measuring sensor while changing the pose of the mobile robot,
    wherein the light source module is disposed near an edge on the upper surface of the mobile robot and the camera module is disposed near the edge on the upper surface of the mobile robot, away from the light source module, the light source module and the camera module being separated by a distance which corresponds to an entire range on the upper surface of the mobile robot.

2. The three-dimensional map-generating apparatus of claim 1, wherein the light source module is a laser.

3. The three-dimensional map-generating apparatus of claim 1, wherein the map-generating unit accumulates three-dimensional data obtained by reflecting the pose of the mobile robot to measured two-dimensional distance data while changing the pose of the mobile robot, thereby generating the three-dimensional map.

4. The three-dimensional map-generating apparatus of claim 1, wherein the pose of the mobile robot includes position and direction angle of the mobile robot.

5. The three-dimensional map-generating apparatus of claim 1, wherein the odometer is an encoder or a gyro.

6. The three-dimensional map-generating apparatus of claim 1, further comprising:
    a plane-extracting unit to extract a plane from the generated three-dimensional map.

7. The three-dimensional map-generating apparatus of claim 6, further comprising:
    a feature-map-generating unit to extract feature points from the extracted plane to generate a feature map.

8. The three-dimensional map-generating apparatus of claim 7, further comprising:
    a position-detecting unit to compare the feature points extracted from the map of the mobile robot at a current position with previously stored feature points on the feature map to detect the position of the mobile robot.

9. A three-dimensional map-generating method, comprising:
    detecting a pose of a mobile robot;
    measuring a distance to an obstacle for the mobile robot using a distance-measuring sensor that includes a light source module disposed on an upper surface of the mobile robot emitting light upward relative to a movement direction of the mobile robot and a camera module, disposed on the upper surface of the mobile robot, capturing an image formed by the light as reflected downward from the obstacle, and measuring the distance to the obstacle using the captured image; and
    generating a three-dimensional map by measuring the distance while changing the pose of the mobile robot,
    wherein the obstacle is upward of the camera module, and the light source module is disposed near an edge on the upper surface of the mobile robot and the camera module is disposed near the edge on the upper surface of the mobile robot, away from the light source module, the light source module and the camera module being separated by a distance which corresponds to an entire range on the upper surface of the mobile robot.

10. The three-dimensional map-generating method of claim 9, wherein the light source module is a laser.

11. The three-dimensional map-generating method of claim 9, wherein the three-dimensional map is generated by accumulating three-dimensional data obtained by reflecting the pose of the mobile robot to measured two-dimensional distance data while changing the pose of the mobile robot.

12. The three-dimensional map-generating method of claim 9, wherein the pose of the mobile robot includes a position and direction angle of the mobile robot.

13. The three-dimensional map-generating method of claim 9, wherein the pose of the mobile robot is calculated based at least on an odometer, with the odometer being an encoder or a gyro.

14. The three-dimensional map-generating method of claim 9, further comprising:
    extracting a plane from the generated three-dimensional map.

15. The three-dimensional map-generating method of claim 14, further comprising:
    extracting feature points from the extracted plane to generate a feature map.

16. The three-dimensional map-generating method of claim 15, further comprising:
    comparing feature points extracted from the map of the mobile robot at a current position with previously stored feature points on the feature map to detect the position of the mobile robot.

17. The three-dimensional map-generating apparatus of claim 1, wherein the obstacle is a feature of a ceiling reflecting the emitted light.

18. The three-dimensional map-generating apparatus of claim 6, wherein the plane is a ceiling above the mobile robot.

19. The three-dimensional map-generating method of claim 9, wherein the obstacle is a feature of a ceiling reflecting the emitted light.

20. The three-dimensional map-generating method of claim 14, wherein the plane is a ceiling above the mobile robot.

\* \* \* \* \*